United States Patent
Yoshida

(10) Patent No.: US 7,493,697 B2
(45) Date of Patent: Feb. 24, 2009

(54) LAWN MOWER

(75) Inventor: Kenichi Yoshida, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/155,307

(22) Filed: Jun. 2, 2008

(65) Prior Publication Data

US 2008/0235958 A1 Oct. 2, 2008

Related U.S. Application Data

(63) Continuation of application No. 11/249,385, filed on Oct. 14, 2005, now abandoned.

(30) Foreign Application Priority Data

Oct. 15, 2004 (JP) .............................. 2004-301988

(51) Int. Cl.
*B26B 7/00* (2006.01)

(52) U.S. Cl. .......................... 30/276; 30/255

(58) Field of Classification Search .................... 30/276, 30/380–387; 56/16.7, 255–256
See application file for complete search history.

(56) References Cited

U.S. PATENT DOCUMENTS

| 1,878,824 | A | | 9/1932 | Dodge |
| 3,430,343 | A | | 3/1969 | Noto et al. |
| 4,006,528 | A | | 2/1977 | Katsuya |
| 4,586,322 | A | | 5/1986 | Yokocho et al. |
| 4,655,032 | A | | 4/1987 | Tanaka |
| 4,817,738 | A | | 4/1989 | Dorner et al. |
| 4,841,929 | A | | 6/1989 | Tuggle et al. |
| 4,887,415 | A | * | 12/1989 | Martin ..................... 56/10.2 R |
| 5,357,738 | A | * | 10/1994 | Griffiths ..................... 56/17.5 |
| 5,774,993 | A | | 7/1998 | Schlessmann |
| 6,105,258 | A | | 8/2000 | Akaike |
| 6,213,677 | B1 | | 4/2001 | Yamane et al. |
| 6,301,788 | B1 | * | 10/2001 | Webster ....................... 30/276 |
| 6,550,145 | B2 | | 4/2003 | Stoll et al. |
| 6,871,484 | B1 | * | 3/2005 | Sartain ....................... 56/12.7 |

(Continued)

FOREIGN PATENT DOCUMENTS

JP 5-2620 1/1993

(Continued)

*Primary Examiner*—Maurina Rachuba
(74) *Attorney, Agent, or Firm*—Smith, Gambrell & Russell, LLP

(57) ABSTRACT

A lawn mower comprises an operation arm, a driven shaft rotatably supported inside the operation arm and having two opposite ends, a cutter operatively connected to one end of the driven shaft, a power source operatively connected to the other end of the driven shaft for generating a drive power to be transmitted to the cutter through the driven shaft, wherein said power source is selective from an engine and an electric motor, an arm side joint case provided on the end of the operation arm, a power source side joint case provided on a housing of the power source and detachably and selectively connected to the arm side joint case, and a centrifugal clutch incorporated in the arm side joint case and having a first member connected to the driven shaft, a second member detachably and selectively connected to the power source and a third member provided to engage the first member and the second member according to the centrifugal force applied thereto.

20 Claims, 4 Drawing Sheets

U.S. PATENT DOCUMENTS

2002/0007559 A1 * 1/2002 Morabit et al. ................ 30/276
2005/0064973 A1 * 3/2005 Schroeder et al. ........... 474/174

FOREIGN PATENT DOCUMENTS

| JP | 10056845 | 3/1998 |
| JP | 2004-8054 | 1/2004 |
| JP | 2006288296 | 10/2006 |

* cited by examiner

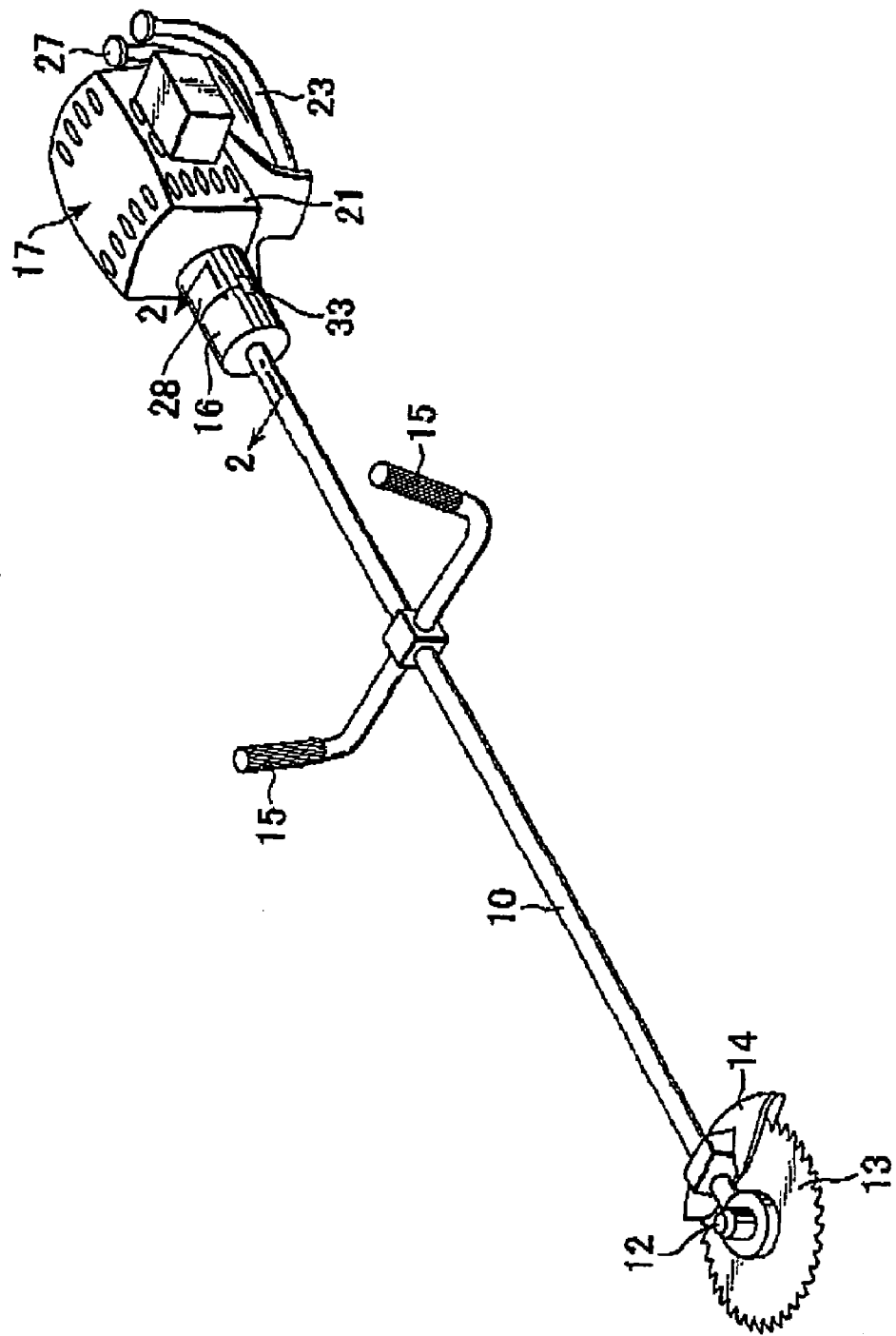

LAWN MOWER

CROSS REFERENCE TO RELATED APPLICATIONS

This application is a continuation of Ser. No. 11/249,385 filed Oct. 14, 2005 now abandoned, which application is incorporated herein by reference in its entirety. Further, the disclosure of Japanese Application No. 2004-301988 filed on Oct. 15, 2004 including the specification, drawing and abstract is incorporated herein by reference in its entirety.

FIELD OF THE INVENTION

This present invention is related to a lawn mower, preferably the lawn mower having a structure to be selectively attached one of an engine and an electric motor as a power source.

BACKGROUND OF THE INVENTION

A lawn mower, also referred to as a grass mower, is used to mow a weed of a footpath in the fields, bottom weed of the forest or pasture grass. There are two types of the lawn mower, one is an arm coupling type and the other is a direct acting type. As for the arm coupling type, a cutter is attached to one end of an operation arm and a power source is attached to the other end of the operation arm. On the other hands, as for the direct acting type, a cutter is directly attached to an axis of a power source. These lawn mowers use either an engine or an electric motor as the power source.

As the lawn mower which uses the electric motor as the power source, as shown in Japanese Utility Model Laid-Open No. 5-2620, the direct acting type lawn mower, where an electric motor is attached to a tip of an operation arm, and a cutter is directly attached to a shaft of the electric motor, is mainly used.

As the lawn mower which uses the engine as the power source, the arm coupling type lawn mower, as shown in Japanese Patent Laid-Open No. 2004-8054, where a cutter is attached to one end of an operation arm and an engine is attached to the other end of the operation arm, is mainly used.

Examples of the arm coupling type lawn mowers include, but are not limited to, a carrying type lawn mower in which an engine is carried on the back puck mount, a shoulder type lawn mower in which a loop-like belt is attached to the operation arm for shoulder-carrying and a handle type lawn mower in which a handle, either looped or two-handed type, is attached on the operation arm for manipulation.

The lawn mower which has the electric motor as the power source can be used where a commercial power supply outlet is placed close to the place of use. It is necessary to use an electric generator when the lawn mower with the electric motor is used where there is no power supply outlet.

In contrast, the lawn mower which has the engine as the power source has the advantage that it can be used even if there is no power supply outlet close to the place of use. However, engine noise at the time of work is louder than a motor drive.

Thus, the lawn mower which has the electric motor as the power source does not generate a loud noise, however, the place where the lawn mower is used is limited to around a house. For this reason, it is not suitable for mowing work on a footpath in fields where there is no supply outlet.

In contrast, the lawn mower which has the engine as the power source can be used even if there is no power supply outlet close to the working place for mowing weeds and grass, however, when mowing work is carried out in the city, the noise problem may bother the neighbors.

For those reasons, the user has to select one of the lawn mowers between the lawn mower having the engine power source and the lawn mower having the electric motor power source according to the use environment.

SUMMARY OF THE INVENTION

An object of the invention is to address the problem discussed above, a preferred embodiment of the invention includes a lawn mower comprising a main body, a driven shaft rotatably supported in the main body and having two opposite ends, a cutter member operatively connected to one end of the driven shaft, a power source operatively connected to the other end of the driven shaft for generating a drive power to be transmitted to the cutter member through the driven shaft, wherein said power source is selective from an engine and an electric motor, and joint means for detachably and selectively connecting the main body and a housing of the power source. Accordingly, both of the engine as the power source and the electric motor as the power source are selectively attached to the main body by joint structures so that a user can select one of the power sources based on the working circumstance. The joint means includes a main body side joint case incorporating a centrifugal clutch therein and a power source side joint case connected to the housing of the power source. The centrifugal clutch can be placed in the housing of the engine instead. The main body is accompanied by a handle for an user to carry the lawn mower during mowing.

It is another object of the present invention to provide a lawn mower comprising an operation arm, a driven shaft rotatably supported inside the operation arm and having two opposite ends, a cutter operatively connected to one end of the driven shaft, a power source operatively connected to the other end of the driven shaft for generating a drive power to be transmitted to the cutter through the driven shaft, wherein said power source is selective from an engine and an electric motor, an arm side joint case provided on the end of the operation arm, a power source side joint case provided on a housing of the power source and detachably and selectively connected to the arm side joint case, and a centrifugal clutch incorporated in the arm side joint case and having a first member connected to the driven shaft, a second member detachably and selectively connected to the power source and a third member provided to engage the first member and the second member according to the centrifugal force applied thereto. The first member comprises a clutch drum, the second member comprises a clutch input shaft rotatably supported by the arm side joint case and the third member comprises a rotor plate fixed to the clutch input shaft, a pivot member rotatably supported on the rotor plate and an extension spring applying the spring force to the pivot member so as to leave the pivot member from the clutch drum, whereby when the rotational speed of the clutch input shaft increases, the centrifugal force moves the pivot member toward the clutch drum against the spring force of the extension spring to have the centrifugal clutch engaged. The arm side joint case and the power source side joint case are fastened by a fasten member.

BRIEF DESCRIPTION OF THE DRAWINGS

FIG. 1(A) is a perspective view to show the lawn mower according to the present invention, in which an engine is attached to a main body as the power source.

DETAILED DESCRIPTION OF THE PREFERRED EMBODIMENTS

A preferred embodiment of the present invention is explained with figures. However, the scope of the invention is not limited by the illustrated embodiments of the figures.

Figure 1B:
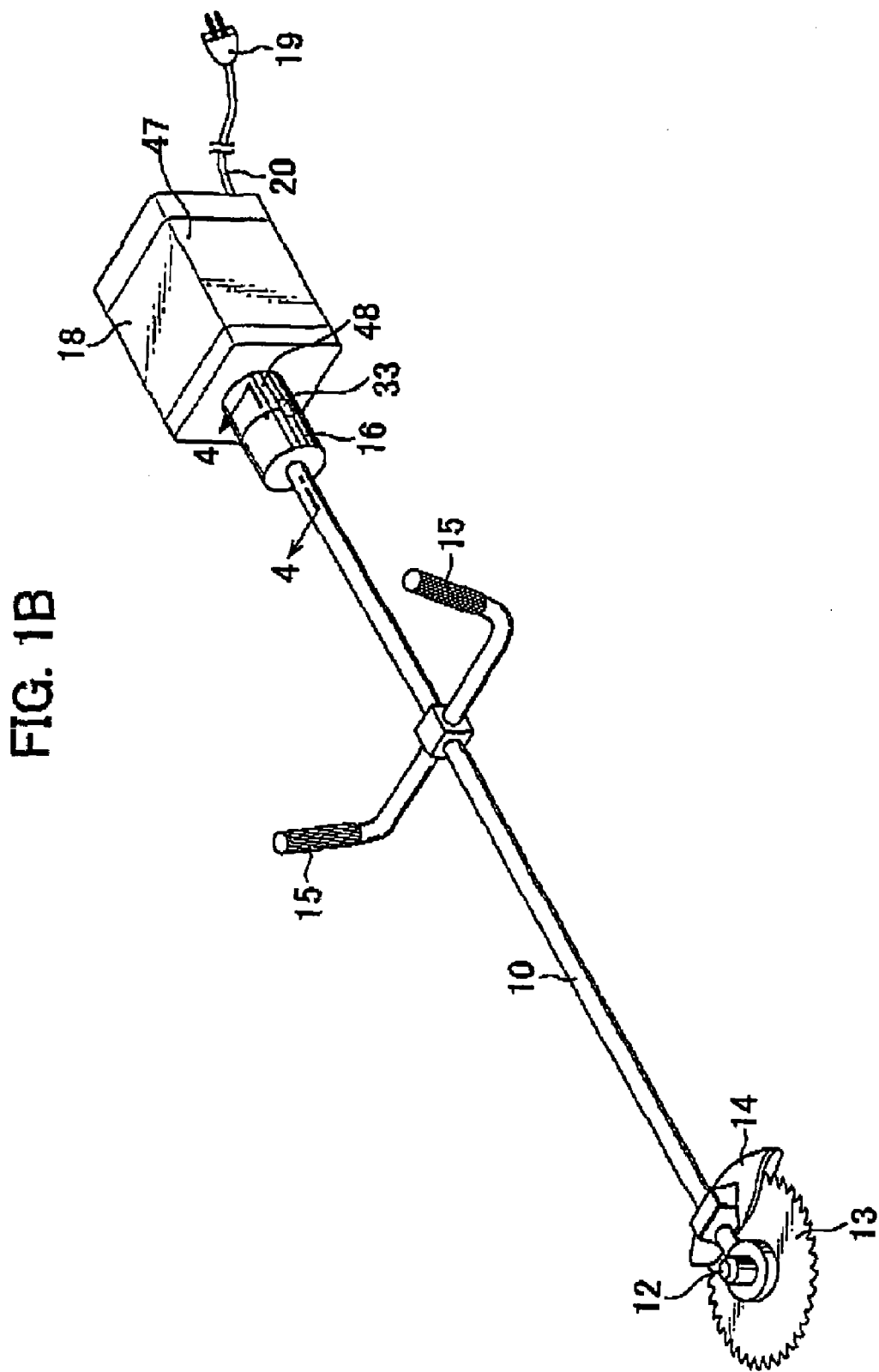
FIG. 1(B) is a perspective view to show the lawn mower according to the present invention, in which an electric motor is attached to a main body as the power source.
Figure 2:
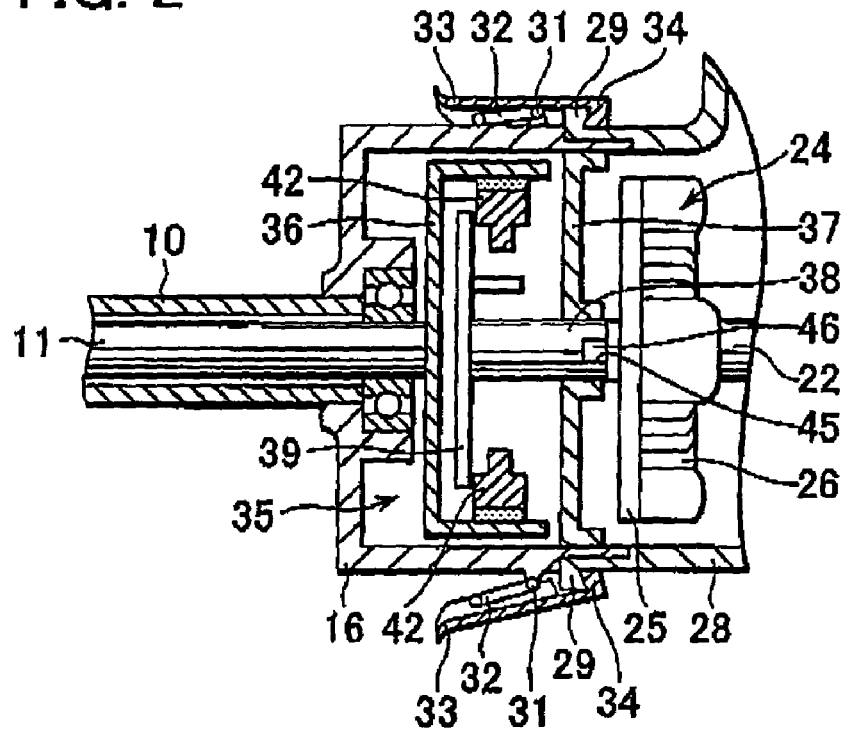
FIG. 2 is an expanded cross-sectional view of FIG. 1(A) along the line 2-2.

A lawn mower shown in FIGS. 1(A) and 1(B), which is the arm coupling type, comprises an operation arm 10 as a main body, a driven shaft 11 rotatably provided inside the operation arm 10 as shown in FIG. 2, a discoid metal cutter 13 installed on the driven shaft 11 at one end of the operation arm 10, an arm side joint case 16 provided at the other end of the operation arm 10 with a large diameter than the operation arm 10 and either one of an engine 17 and an electric motor 18 selectively installed on the operation arm 10 through the joint case 16. The operation arm 10 is formed of a hollow shaft. A holder 12 is attached to the one end of the operation arm 10. The metal cutter 13 has a plurality of saw-edged cutting tooth on its outer peripheral and is rotatably attached to the holder 12. The cutter 13 is connected to the end of the driven shaft 11 through a pair of bevel gears (not shown). The operation arm 10 has a cover 14 at its end to partially cover the cutter 13 so that the safety of work is secured. In addition, the cutter 13 may be replaced by a cutter composed of one or more strings extending radially from the center of rotation.

Two handles 15 are installed on a center part of the operation arm 10 so that the user can work on mowing grass by gripping the handles 15 with both hands. In place of the two-handed type handles 15 as shown in FIGS. 1(A) and 1(B), a looped type handle may be used. Furthermore, a loop-like belt can be attached to the operation arm 10 for shoulder carrying the mower.

The arm side joint case 16, as a main body side joint case, is provided on the opposite end of the operation arm 10 from the cutter 13. The arm side joint case 16 is constructed by a cylindrical member of a large diameter than the operation arm 10. Either an engine 17 as shown in FIG. 1(A) or an electric motor 18 as shown in FIG. 1(B) is selectively attached to the operation arm 10 through the arm side joint case 16. The electric motor 18 has a power supply cable 20 with an electrical plug 19 which is inserted into the power supply outlet so as to supply electric power to the electric motor 18. Otherwise, a battery may be used as the power supply instead of the commercial power supply. By using the battery as the power supply, the lawn mower can be quietly driven by the motor in the outdoors with no power supply outlet.

The engine 17 is a single cylinder 4-stroke cycles engine. Inside of an engine cover 21, there are engine components such as a crankcase for rotatably supporting an engine output shaft 22 connected to a crankshaft shown in FIG. 2, and a cylinder in which a piston travels reciprocally is provided in the crankcase. Also, the engine 17 is equipped with a fuel tank 23 storing fuel of gasoline. A cooling fan 24 generating engine cooling air is installed on the output shaft 22. The cooling fan 24 comprises a disk 25 connected to the output shaft 22 and a plurality of fan blades 26 fixed to the disk 25. Further, the engine 17 is equipped with a recoil starter for turning the output shaft 22 manually so that the engine 17 can be started by pulling a recoil knob 27 as shown in FIG. 1(A).

An engine side joint case 28, as a power source side joint case, which can be attached to and removed from the arm side joint case 16, is provided on the engine cover 21. As shown in FIG. 2, this engine side joint case 28 is partly fitted to the arm side joint case 16. On the outer surface of the arm side joint case 16, one end of a link 32 is swingably connected to a supporting point 31 of the outer surface of the arm side joint case 16 and the other end of the link 32 is swingably connected to a middle portion of a tightening lever 33. A detent projection 34 is provided at one end of the tightening lever 33 as a fastener member, so as to be selectively engaged with a projection 29 formed on the engine side joint case 28. When the tightening lever 33 is pushed down to the arm side joint case 16 after engaging the detent projection 34 with the projection 29, the tightening lever 33 tightly couples the joint case 16 of the operation arm 10 and the joint case 28 of the engine 17.

In addition, regarding the fastener member, it is not limited to the structure shown in FIG. 2. For example, bolts can be used to couple the joint cases 16 and 28 of the operation arm 10 and the engine 17. Furthermore, a connecting sleeve is rotatably attached to the outside of the arm side joint case 16, and the engine side joint case 28 may be provided with a male screw to be coupled with a female screw which is provided inside the connect sleeve so that the operation arm 10 and the engine 17 can be screwed.

Figure 3:
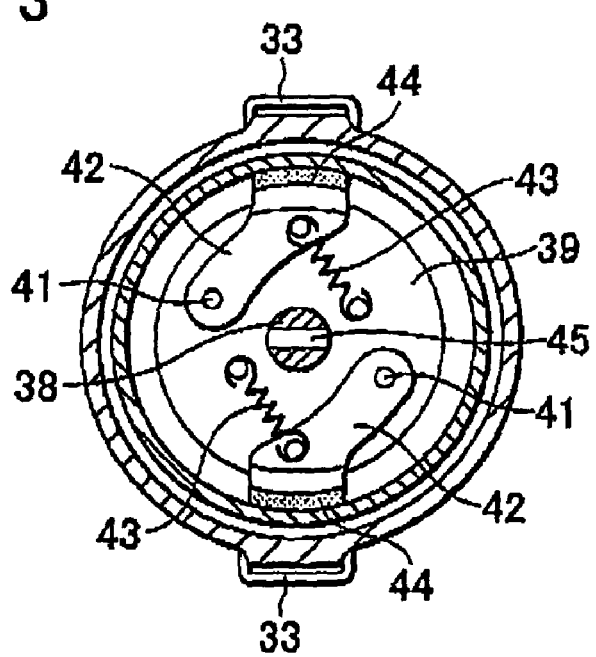
FIG. 3 is a cross-sectional view of FIG. 2.

The arm side joint case 16, which is formed of a cylindrical member, incorporates a centrifugal clutch 35 inside. This centrifugal clutch 35 comprises a clutch drum 36 fixed to the driven shaft 11 and a clutch input shaft 38 rotatably supported by a supporting wall 37. As shown in FIG. 3, a plurality of pivot members 42 are rotatably supported by a pin 41 on a rotor plate 39 fixed to the clutch input shaft 38. Spring force of an extension spring 43 is applied to each pivot member 42 so as to leave a frictional contact region 44 of the pivot member 42 from an internal surface of the clutch drum 36. Thus, when the rotational speed of the clutch input shaft 38 increases, the centrifugal force applied to the pivot members 42 moves the pivot members 42 toward the internal surface of the clutch drum 36 against the spring force of the extension springs 43, whereby the clutch input shaft 38 and the driven shaft 11 are connected through the pivot members 42. On the other hand, when the engine 17 is started by pulling the recoil knob 27, the centrifugal clutch 35 has not been engaged so that the recoil knob 27 can be pulled without a big resistance being applied.

An engaging groove 45 is provided across the end of the clutch input shaft 38 of the centrifugal clutch 35 in a diametrical direction. An engaging projection 46 to be engaged with the engaging groove 45 is provided on the side of the disk 25 of the cooling fan 24 opposite to the fan blades 26. Thus, the driven shaft 11 and the engine output shaft 22 are coupled through the centrifugal clutch 35 with the engagement of the engaging groove 45 and the engaging projection 46. In addition, it is also suggested that the engaging groove and the engaging projection can be provided vice versa.

As shown in FIG. 2, in order to attach the engine 17 to the operation arm 10, first the engaging groove 45 and engaging projection 46 are engaged each other, then the engine side joint case 28 of the engine cover 21 is fitted to the arm side joint case 16 of the operation arm 10, and finally the tightening lever 33 as the fastening member is manipulated to tighten the joint cases 16 and 28. According to this structure, the lawn mower drives the cutter 13 by the driving force of the engine 17 so that grass can be mowed.

Figure 4:
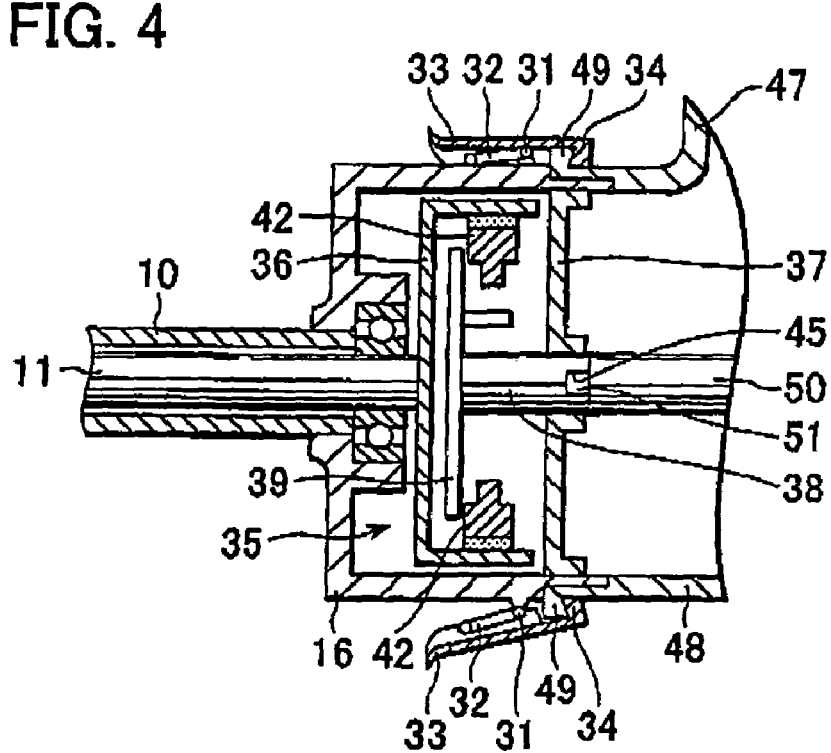
FIG. 4 is an expanded cross-sectional view of FIG. 1(B) along line 4-4.

As shown in FIG. 1(B), the electric motor 18 has motor cover 47 shown in FIG. 4, a cylindrical motor side joint case 48, as the power source side joint case, which is the same size as the engine side joint case 28 is attached to this motor cover 47. The motor side joint case 48 has a projection 49 with which a detent projection 34 of a tightening lever 33 installed in the arm side joint case 16 is adapted to engage. An engaging projection 51 is provided on the end of a motor output shaft 50 so as to engage with the engaging groove 45 provided across the end of the clutch input shaft 38. According to this structure, the driven shaft 11 and the motor output shaft 50 are coupled through the centrifugal clutch 35 with the engagement of the engaging groove 45 and the engaging projection 46.

Thus, as shown in FIG. 4, in order to attach the electric motor 18 to the operation arm 10, first the engaging groove 45 and the engaging projection 51 are engaged each other, then the motor side joint case 48 of the motor cover 47 is fitted to the arm side joint case 16 of the operation arm 10, and finally the tightening lever 33 as the fastening member is manipulated to tighten the joint cases 16 and 48. According to this structure, the lawn mower drives the cutter 13 by the driving power of the electric motor 18 so that grass can be mowed.

According to the above disclosure, the user can selectively install either one of the engine 17 and the electric motor 18 on the operation arm 10 with the preparation of both the engine 17 and the electric motor 18 as attachments to a lawn mower. That is, the lawn mower can be used as whichever with an engine drive type and a motor drive type on the basis of the mowing environment. For example, the engine 17 would be used as the power source in the situation where there is no power supply outlet or at the place where silence is not required. On the other hands, the electric motor 18 would be used as the power source in the situation where there is a power supply outlet. That is, the user can select either the engine 17 or the electric motor 18 as the power source based on the working environment. In addition, even if the user has purchased the lawn mower comprising the operation arm 10 and the engine 17 as a set, the lawn mower can be changed to the electric motor operation by purchasing the electric motor 18, additionally.

Figure 5:
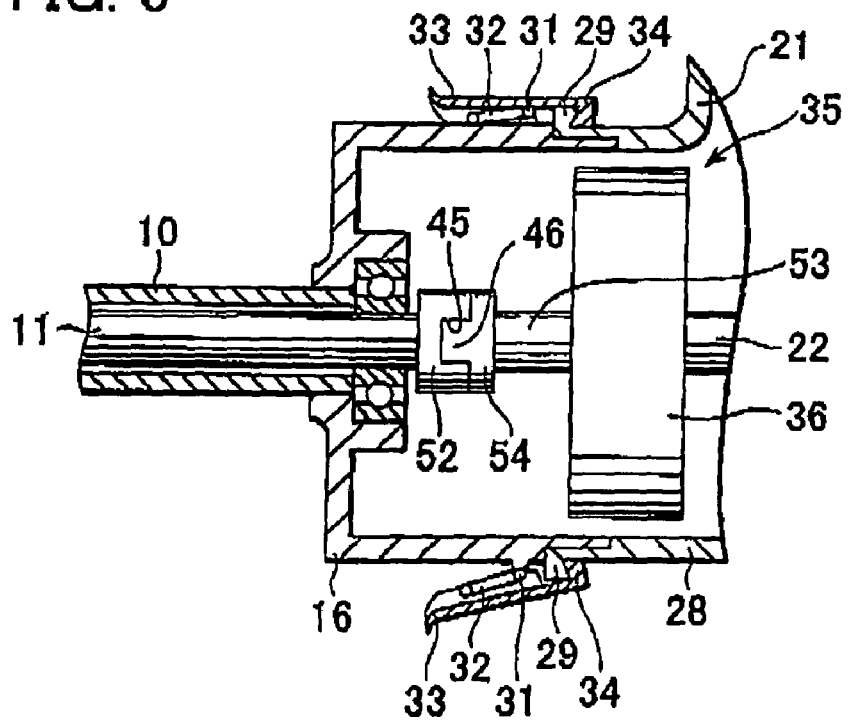
FIG. 5 is a cross-sectional view, of the other embodiment of the lawn mower according to the present invention, which is equivalent to FIG. 2.

FIG. 5 is a sectional view of a second embodiment of the lawn mower of the present invention. This view shows the same portion as FIG. 2. In this lawn mower, the centrifugal clutch 35 is incorporated inside the joint case 28 of the engine cover 21. A large-diameter flange 52 having the engaging groove 45 is provided on the end of the driven shaft 11. And, a large-diameter flange 54 having the engaging projection 46 is provided on the end of a clutch output shaft 53 secured to the clutch drum 36 of the centrifugal clutch 35. The engaging projection 46 is adopted to couple with the engaging groove 45.

In this embodiment, the motor output shaft 50 of the electric motor 18 is coupled with a large diameter flange 52 of the driven shaft 11 directly. Furthermore, the centrifugal clutch 35 may be installed to the extent of the operation arm 10 or may be installed inside the engine 17.

The present invention is not limited by the above-described preferred embodiment; it can be changed in various ways in the range that does not deviate from the subject matter. For example, this invention can be applied to such a lawn mower that the power source and the cutter are installed on a carriage.

What is claimed:

1. A lawn mower comprising;
   a main body;
   a driven shaft rotatably supported in the main body and having two opposite ends;
   a cutter member operatively connected to one end of the driven shaft;
   a centrifugal clutch;
   a power source operatively connected to the other end of the driven shaft for generating a drive power to be transmitted to the cutter member through the driven shaft, wherein the power source is selectable from an engine and an electric motor, and wherein said centrifugal clutch is present both when said engine is selected as said power source and said electric motor is selected as said power source, and wherein said centrifugal clutch has an output shaft detachably connected to the other end of the driven shaft and has a clutch input shaft in driving engagement with the power source.

2. The lawn mower according to the claim 1, further comprising;
   a handle provided on the midst of the main body for a user to carry the lawn mower during mowing.

3. The lawn mower according to the claim 1, further comprising;
   joint means for detachably and selectively connecting the main body and a housing of the power source, wherein the joint means includes a power source side joint case incorporating said centrifugal clutch therein and a main body side joint case connected to the power source side joint case.

4. The lawn mower according to the claim 1, further comprising:
   a main body side joint case provided on the opposite end of the main body from the cutter;
   a power source side joint case provided on a housing of the power source, and detachably and selectively connected to the main body side joint case; and
   a releasable fastener for fastening the main body side joint case and the power source side joint case.

5. The lawn mower according to the claim 4, wherein said centrifugal clutch is detachably connected to the other end of the driven shaft by way of a detachable connection arrangement, which detachable connection arrangement provides for free axial detachment of said output shaft from said driven shaft upon release of the connection between said power source side joint case and said main body side joint case.

6. The lawn mower according to the claim 4, wherein said power source side joint case comprises a cup-shape member within which is positioned said centrifugal clutch.

7. The lawn mower according to the claim 6, wherein said main body side joint case is a cup-shaped member which abuts said cup-shaped member of said power source side joint case, and said releasable fastener which, when fastened, retains said cup-shaped members in an abutting relationship, and the output shaft of said centrifugal clutch and said driven shaft have a projection and recess engagement arrangement which is axially retained in position by said releasable fastener when fastened.

8. The lawn mower according to claim 1, wherein the output shaft of said centrifugal clutch and the driven shaft have a projection and recess engagement arrangement which transmits rotational forces while being freely axially detachable and held in an axial engagement state by a connection of said main body to said power source.

9. A lawn mower comprising;
   an operation arm;
   a driven shaft rotatably supported inside the operation arm and having two opposite ends;

a cutter operatively connected to one end of the driven shaft;

a power source operatively connected to the other end of the driven shaft for generating a drive power to be transmitted to the cutter through the driven shaft, wherein said power source is selectable from an engine and an electric motor;

an arm side joint case provided on the opposite end of the operation arm from the cutter;

a power source side joint case provided on a housing of the power source and detachably and selectively connected to the arm side joint case; and a centrifugal clutch incorporated in the arm side joint case and having a first member connected to the other end of the driven shaft, a second member detachably and selectively connected to the power source by way of a connection that is freely detachable upon detachment of said power source side joint case and said arm side joint case and a third member provided to engage the first member and the second member according to the centrifugal force applied thereto.

10. The lawn mower according to the claim 9, wherein the first member comprises a clutch drum, the second member comprises a clutch input shaft rotatably supported by the arm side joint case and the third member comprises a rotor plate fixed to the clutch input shaft, a pivot member rotatably supported on the rotor plate and an extension spring applying the spring force to the pivot member so as to leave the pivot member from the clutch drum, whereby when the rotational speed of the clutch input shaft increases, the centrifugal force moves the pivot member toward the clutch drum against the spring force of the extension spring to have the centrifugal clutch engaged.

11. The lawn mower according to claim 9, further comprising:

a fasten member for fastening the arm side joint case and the power source side joint case.

12. The lawn mower according to the claim 9, further comprising:

a handle provided on the midst of the main body for an user to carry the lawn mower during moving.

13. The lawn mower according to claim 9, wherein said second member comprises a clutch input shaft having a free end which forms part of a projection and recess driving engagement with an output shaft of the power source and which projection and recess driving engagement arrangement is freely axially detachable and held in axial engagement by a connection of said arm side joint case.

14. The lawn mower according to the claim 9, wherein said second member has an input shaft of said centrifugal clutch supported by a plate member contained within one of said arm side joint case or said power source side joint case.

15. A lawn mower comprising:

a main body;

a driven shaft rotatably supported in the main body and having two opposite ends;

a cutter member operatively connected to one end of the driven shaft;

a power source operatively connected to the other end of the driven shaft for generating a drive power to be transmitted to the cutter member through the driven shaft, wherein said power source is selectable from an engine and an electric motor; and a drive transmission line extending between said cutter member and said power source, said drive transmission line including an axially detachable, meshing coupling arrangement which is in direct rotative drive engagement when said power source is operatively connected to the other end of the driven shaft while said power source is in a non-running state, and is freely axially detachable upon release of a previously selected power source and replacement with an opposite one of said electric motor and engine as said power source, and said drive transmission line includes a centrifugal clutch that is in line with the power source both when said electric motor is selected as said power source as well as when said engine is selected as said power source.

16. The lawn mower according to the claim 15, wherein the detachable, meshing coupling arrangement comprises a connected shaft arrangement having a projection and recess shaft pair, which pair comprises an engaging groove and an engaging projection, and wherein one of the engaging groove or the engaging projection is provided on a clutch input shaft of said centrifugal clutch and the other is provided on a cooling fan connected to an output shaft of the power source.

17. The lawn mower according to the claim 15, wherein the detachable, meshing coupling arrangement comprises a connected shaft arrangement having a projection and recess shaft pair, which pair comprises an engaging groove and an engaging projection, and wherein one of the engaging groove or the engaging projection is provided on a clutch input shaft of said centrifugal clutch and the other is provided on an output shaft of the power source.

18. The lawn mower according to the claim 15, wherein the detachable, meshing coupling arrangement comprises a connected shaft arrangement having a projection and recess shaft pair, which pair comprises an engaging groove and an engaging projection, and wherein one of the engaging groove or the engaging projection is provided on driven shaft and the other is provided on a clutch output shaft of said centrifugal clutch.

19. The lawn mower according to the claim 15, wherein said centrifugal clutch is incorporated within the transmission line at a location between said driven shaft and an output shaft of the power source.

20. The lawn mower according to claim 15, further comprising:

an arm side joint case;

a power source side joint case;

a releasable fastener for axially securing together said joint cases; and a clutch input shaft of said centrifugal clutch is supported by a plate member contained within one of said joint cases.

* * * * *